United States Patent [19]

Lüst

[11] Patent Number: 5,435,368
[45] Date of Patent: Jul. 25, 1995

[54] TIRE-RETENTION DEVICE AND WHEEL RIM

[75] Inventor: Richard Lüst, Oxon, Great Britain

[73] Assignee: Technovia Patents Limited, Nottingham, United Kingdom

[21] Appl. No.: 108,583

[22] PCT Filed: Mar. 3, 1992

[86] PCT No.: PCT/GB92/00372

§ 371 Date: Sep. 7, 1993

§ 102(e) Date: Nov. 4, 1993

[87] PCT Pub. No.: WO92/15463

PCT Pub. Date: Sep. 17, 1992

[30] Foreign Application Priority Data

Mar. 4, 1991 [GB] United Kingdom ............... 9104484

[51] Int. Cl.⁶ ........................................... B60B 21/12
[52] U.S. Cl. ............................... 152/381.6; 152/381.5
[58] Field of Search ............... 152/381.4, 381.5, 381.6, 152/400, 401, 381.3

[56] References Cited

U.S. PATENT DOCUMENTS

| | | | |
|---|---|---|---|
| 4,078,597 | 3/1978 | Noda | 152/381.6 |
| 4,122,882 | 10/1978 | Fisher et al. | 152/381.2 WC |
| 4,374,535 | 2/1983 | Watts | 152/381.6 |
| 4,694,874 | 9/1987 | White | 152/381.6 |

FOREIGN PATENT DOCUMENTS

| | | | |
|---|---|---|---|
| 0014097 | 8/1980 | European Pat. Off. | 152/381.5 |
| 2189222 | 1/1974 | France . | |
| 2321345 | 11/1973 | Germany | 152/381.5 |
| 1417854 | 12/1975 | United Kingdom . | |

*Primary Examiner*—Russell D. Stormer
*Attorney, Agent, or Firm*—Jones, Tullar & Cooper

[57] ABSTRACT

A well-filler of variable width for a drop-center wheel including a band for circumposing the wheel rim in the well in engagement with a plurality of segments, the fist and second ends of the band being attached to mutually engageable connectors that are adjustable for tightening the band. When the band is fitted it tightens in the well and the segments are urged in directions transverse to the direction of the band so that the width of the well-filler matches that of the well.

13 Claims, 8 Drawing Sheets

TIRE-RETENTION DEVICE AND WHEEL RIM

BACKGROUND OF THE INVENTION

This invention relates to a well-filler for retaining a tire on a drop-center wheel rim.

A common wheel design of has a rim (known as a drop-center rim) in which there is a comparatively narrow well which effectively reduces the diameter of the wheel all around its circumference. Such a well facilitates the mounting of a pneumatic tire on the wheel. One inextensible bead of a tire is slipped over the lip of a side flange of the rim and into the well and then the diametrically opposite part of that bead of the tire is then able to be passed over the flange and be mounted on the rim. Inflation of the tire forces the beads into their correct position with their feet engaged on slightly conical seats adjacent the flanges.

A major problem with wheels with drop-center rims is that without a device to fill the well there is a danger of the tire detaching itself upon a loss of air pressure, for example after a puncture. One of the beads may slip into the well and the mounting procedure for the tire be effectively reversed. This loss of concentricity involves loss of control, and is dangerous if it happens on a vehicle travelling at high speed.

Band devices for filling wheel wells are known. However, well-fillers of current designs have to be made individually for different types of wheel of different diameter and especially for wells of different effective widths. None of the known well-fillers is adjustable in width. In addition, current designs have to be made in different materials to suit steel and alloy wheels the properties of which vary differently with temperature and load changes.

SUMMARY OF THE INVENTION

According to the present invention there is provided a well-filler of variable width for a well of a drop-center wheel rim, the well-filler having a band for circumposing the rim in the well in engagement with a plurality of obstructor segments, and mutually engageable connector means at first and second ends of the band, the connector means being adjustable for tightening of the band in the well around the rim, engagement of the band with the segments being such that when the band is tightened in the well of a wheel rim the segments are urged in directions transverse to the band so that the width of the well-filler matches that of the well.

Preferably, the band extends through a channel in a body portion of each segment, the channel having an engagement surface to engage with a corresponding surface of the band, the engagement and corresponding surfaces being angled such that tightening of the band around the rim causes the segment support to be urged in a direction transverse to the band axis. The engagement surface on the band is preferably one of a pair of equally-inclined surfaces forming a V-shape in cross-section; these may respectively engage with an inclined engagement surface of the segments which is one of a pair of surfaces forming an equally inclined V-shape in cross-section.

Preferably, the segments are arranged so that alternate ones are urged towards opposite transverse directions. The segments may be substantially identical to each other but be oriented in opposite senses to achieve relative motion in opposite directions.

Preferably the obstructor segments are flexible so that they may curve to follow the arc of the band around the rim.

The connector means may be pivotally attached at the ends of the band and the position of their attachment to the band may be varied. This gives accommodation to the diameter of the wheel to which the device is to be applied. The connector means may be mutually engaged via a socket head screw and locking nut. The attachment of the connector means at the ends of the band then facilitates location of the screw in the nut.

In an alternative embodiment the band has a slot to receive a cable. When the slot is on an outer peripheral surface of the band it should be of sufficient depth so that the cable does not protrude from the band. At first and second ends of the cable, mutually engageable connector means may be rotatably attached, and the position of the connector means on the cable may be variable to provide a band whose length is adjustable according to the circumference of the well to which it is going to fit.

Preferably the connector means are provided with a shaped base portion to fit in the bottom of the channel in the end segments. This assists the correct alignment of the connector means, both during fitting and use, and stabilizes the ends of the band in use.

In a preferred embodiment, a top portion of the obstructor segments adjacent the connector means is absent to expose the bottom of the channel and further accommodate the connector means if they are too large to fit inside the channel as well as to facilitate fitting and removal of the well filler band.

Preferably, the connector means are such that once they are engaged and the band is tightened there is enough clearance between them for the valve of a tubed tire to protrude into the wheel well.

The connector means should desirably have no sharp edges or protrusions so that the well-filler is suitable for use with tubed and tubeless tires.

Preferably the device has alignment means to keep the segments in circumferential alignment on the band prior to tightening of the band. A protrusion on the segments may be engageable with a recess or groove in the band for this purpose. Alternatively, a protrusion on the band may be engageable with a recess or groove in the segments. Preferably the alignment means disengage automatically when the band is tightened. Each segment may have a hole through which tool may be inserted to facilitate disengagement of the alignment means. The tool may be a screwdriver.

DETAILED DESCRIPTION OF THE PREFERRED EMBODIMENTS

Figure 1:
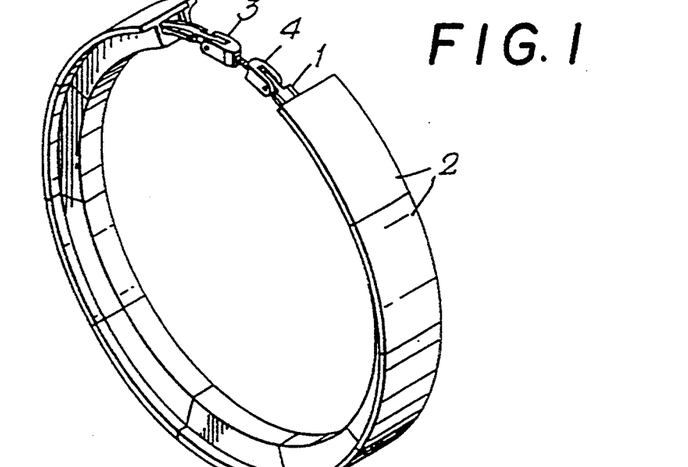
FIG. 1 shows a well-filler which is a first embodiment of the invention.
Figures 2, 3, 4:
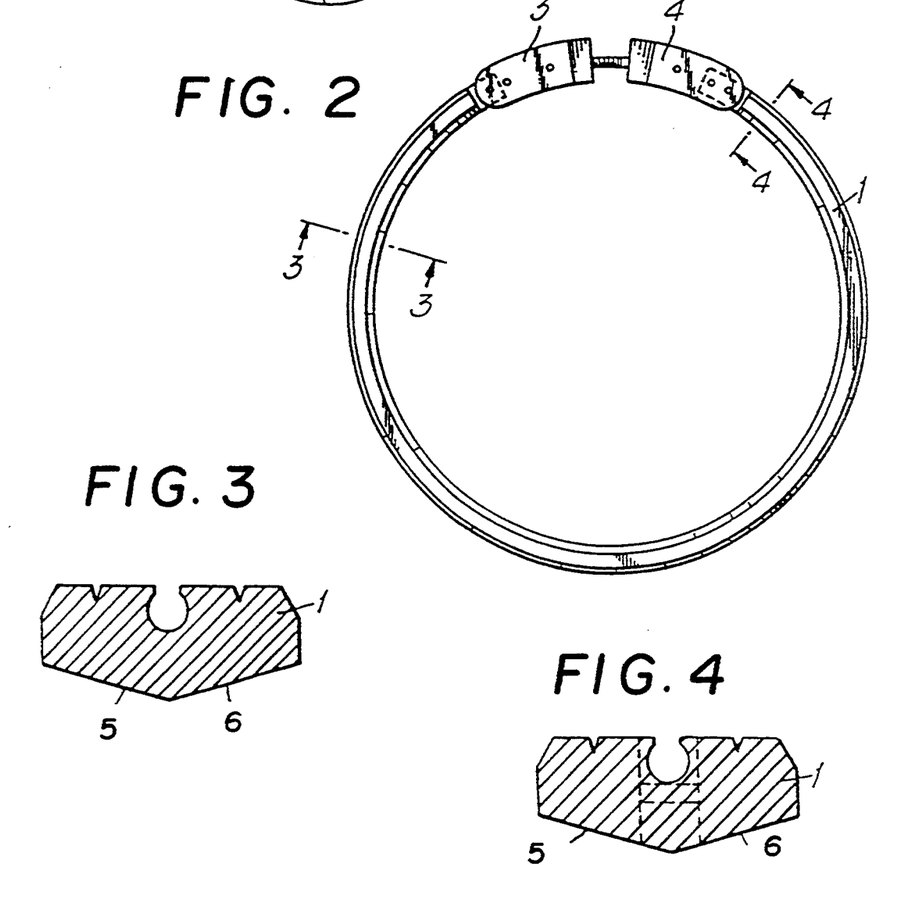
FIG. 2 shows a side view of the band seen in FIG. 1.
FIGS. 3 and 4 show cross-sections through the band on lines 3—3 and 4—4 of FIG. 2 respectively.

In FIGS. 1-7, a well-filler according to an embodiment of the present invention, has a band 1 obstructor segments 2 and connector means 3 and 4. FIGS. 2, 3 and 4 show that the band has a pair of engagement surfaces 5 and 6 forming a V-shape in cross-section, with the V-shape being broader in a region at an end of the band than at a point between end regions.

Figure 7:
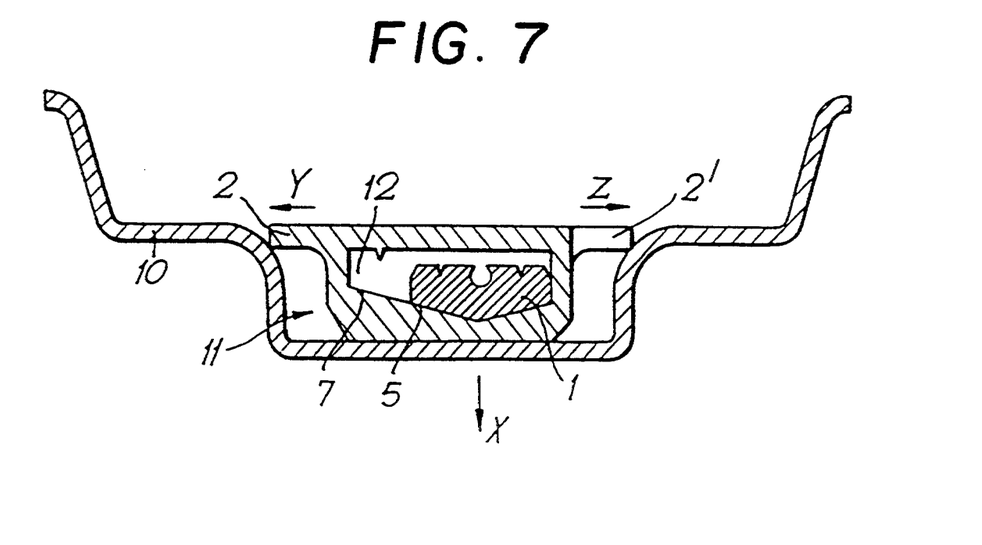
FIG. 7 shows a cross-section through a drop-center wheel rim and the embodiment of a well-filler positioned in the well of the rim.

In use, a well-filler is placed around a drop-center wheel rim 10 in well 11 of the rim. Connector means 3 and 4 are engaged and the band tightened. FIG. 7 shows a cross-section through a rim 10 with a well-filler in position in the well 11.

Band 1 extends through channel 12. Inclined surface 5 of the band is in sliding engagement with corresponding surface 7 of the channel so that force in the dissection of arrow X due to the tightening of the band 1 causes obstructor segment 2 to be urged in the direction of arrow Y transverse to the band 1. The obstructor segments 2 and 2' are identical but are oriented in opposite senses so that they are urged in opposite directions on tightening of the band 1. Force in the direction of arrow X due to tightening of the band 1 causes obstructor segment 2' to be urged in the direction of arrow Z. Alternate segments around the rim 10 are oriented so as to be urged in opposite directions towards opposite sides of the well 11.

Tightening of the band then causes the well-filler to expand width-wise until its width matches that of the well 11.

Figure 5:
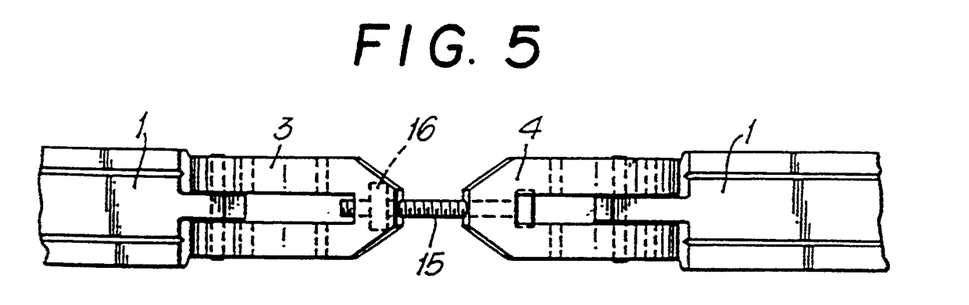
FIGS. 5 and 6 show connectors of the embodiment from above and from the side respectively.
Figure 6:
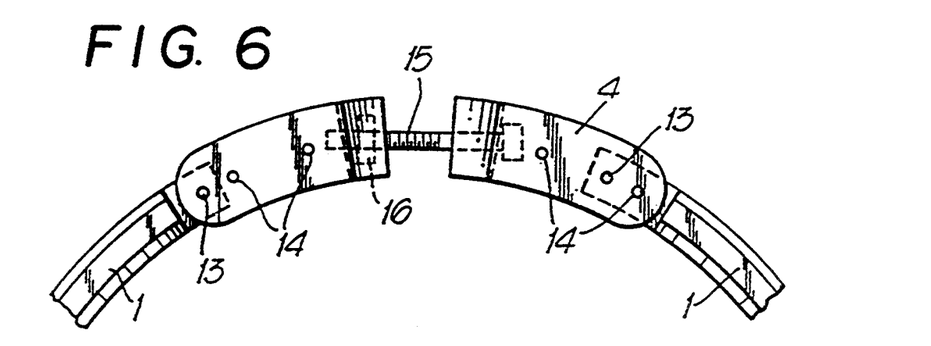

FIGS. 5 and 6 shows that the connector means 3 and 4 are pivotally attached at the ends of the band 1 by pins 13. The connector means 3 and 4 have several holes 14 through which a pin 13 may pass so that the position of attachment of the connector means 3 and 4 may be varied according to the diameter of the wheel to which the well-filler is to be applied. Connector 4 holds a socket cap screw 15 which engages with "Nylock" locking nut 16 contained in connector 3. The connector means 3 and 4 are moulded with no sharp edges or protrusions so that the well-filler is suitable for use with tubed and tubeless tires.

Figure 8:
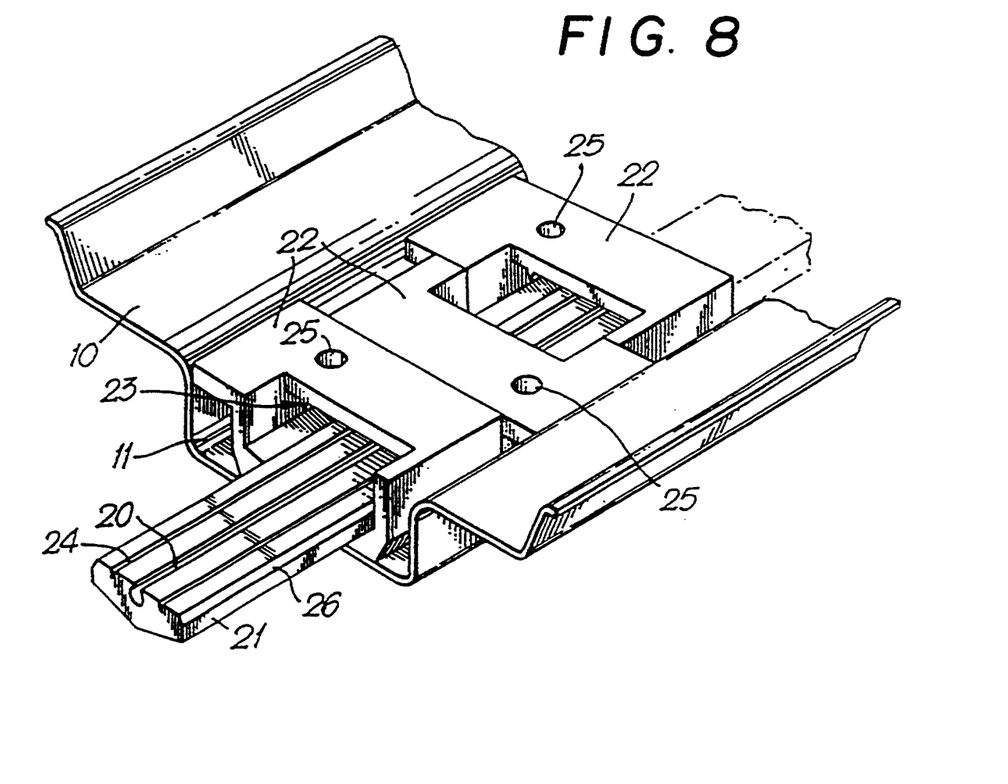
FIG. 8 shows a perspective cross-sectional elevation of a wheel rim and a well-filler which is a second embodiment of the present invention.
Figure 9:
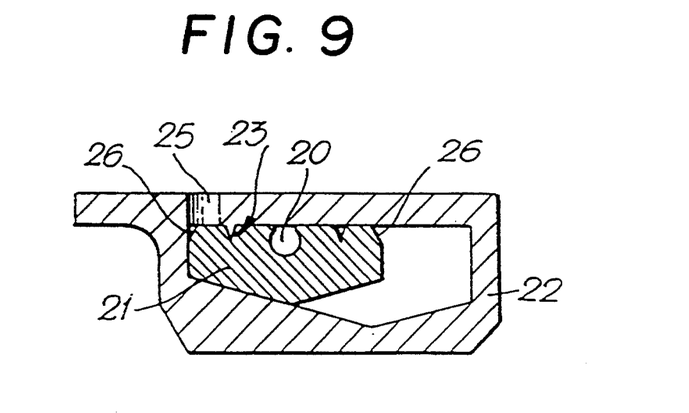
FIG. 9 shows a cross-section through the second embodiment with an obstructor segment and band alignment means.

FIGS. 8 and 9 show a well-filler according to a second embodiment of the present invention which includes alignment means to keep obstructor segments 22 in alignment on the band 21 prior to tightening. The alignment means comprises a protrusion 23 on the segments 22 which is engageable with a slot 24 on the band 21. FIG. 8 shows the well-filler in the well 11 of rim 10 after tightening of the band 21. Segments 22 are urged transversely to the band 21 so that the width of the well-filler matches that of the well. Alternate segments 22 are urged in opposite directions towards opposite sides of the well 11. Gaps between the segments and sides of the well away from which they have moved are too narrow and cover too little of the circumference of the rim 1 for a tire to fall into them. Any forge from a tire bead falling even slightly into a gap will only push the associated segment harder into the opposite side of the well, so a segment cannot be dislodged by such a force. FIG. 9 shows the alignment means of band 21 and a segment 22 engaged prior to tightening of the band 21. In this embodiment, the segments have a hole 25 for insertion of a tool to facilitate disengagement of the alignment means on tightening of the band 21. The band 21 has bevelled surfaces 26 for engagement with a tool for this purpose.

Figure 10:
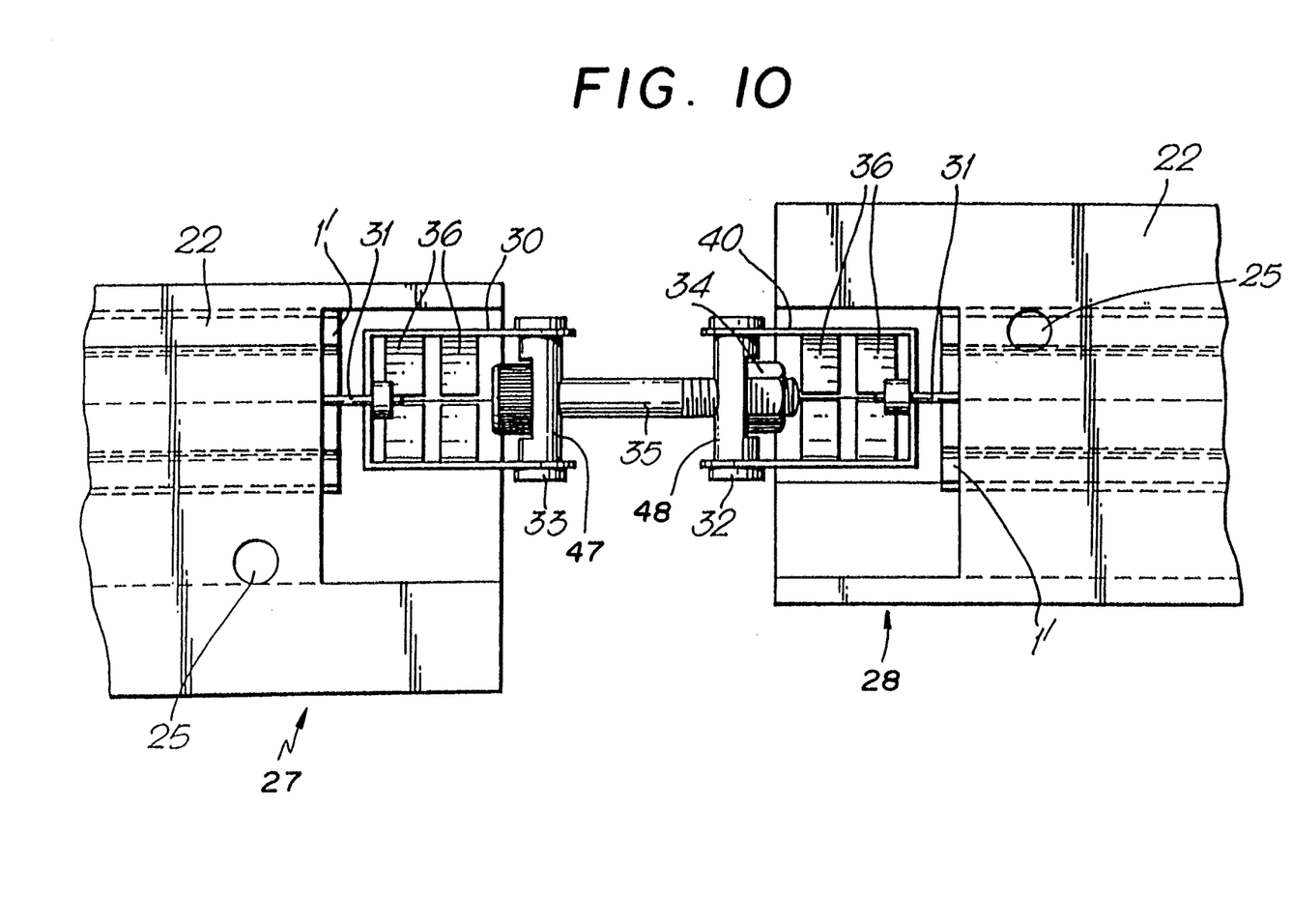
FIG. 10 is a plan partial view of adjacent ends of the band and the connector means with the top portion absent.

FIG. 10 shows a partial plan view of adjacent ends 27,28 of a second embodiment of band 1' and connector means 30,40. The connector means 30,40 are attached to a cable 31, which is itself received in a slot 20 along the length of the band 1'. The connector means 30,40 are provided with rollers 32,33 which are rotatably received in said connector means 30,40 at right angles to the direction of the band 1' and have apertures to allow a fixing bolt 35 to pass through and secure the band 1' by means of a locking nut 34. The rollers 32,33 allow the fixing bolt 35 to articulate to compensate for the curvature of the drop center wheel rim 10.

The connector means 30,40 are provided with a V-shaped base 36 at the same inclination as the base 42 of the channel 12 through the obstructor segment 22. This helps to stabilize the connector means 30,40 in the base 42 of the channel 12 and allows free access to the connector means 30,40 for fitting and removal.

Figure 11:
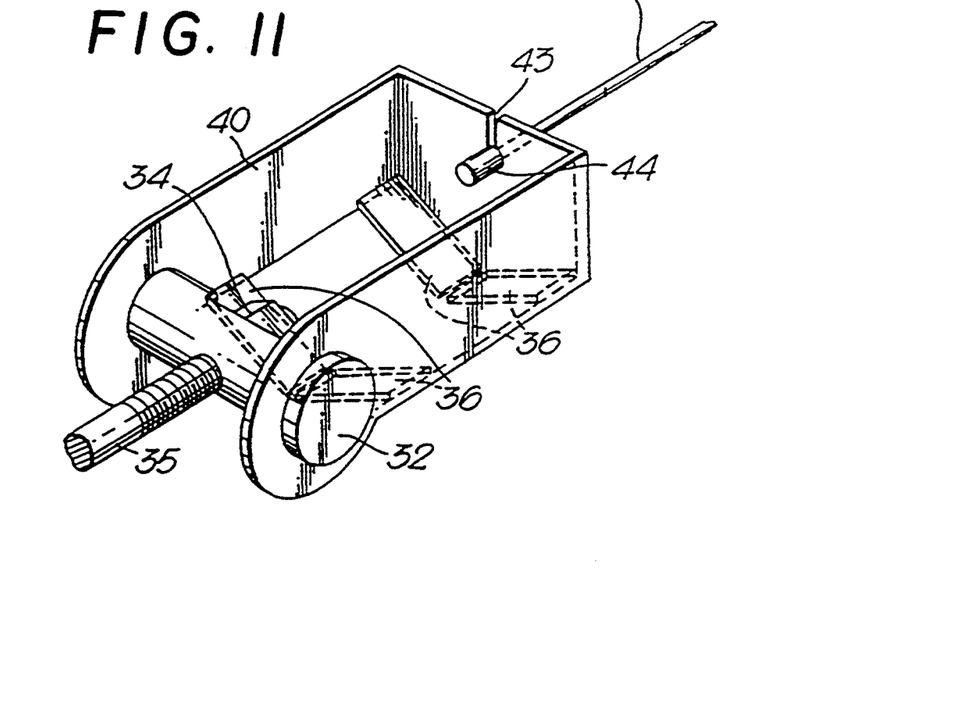
FIG. 11 shows a perspective view of a connector in a variant of the present invention.
Figure 12:
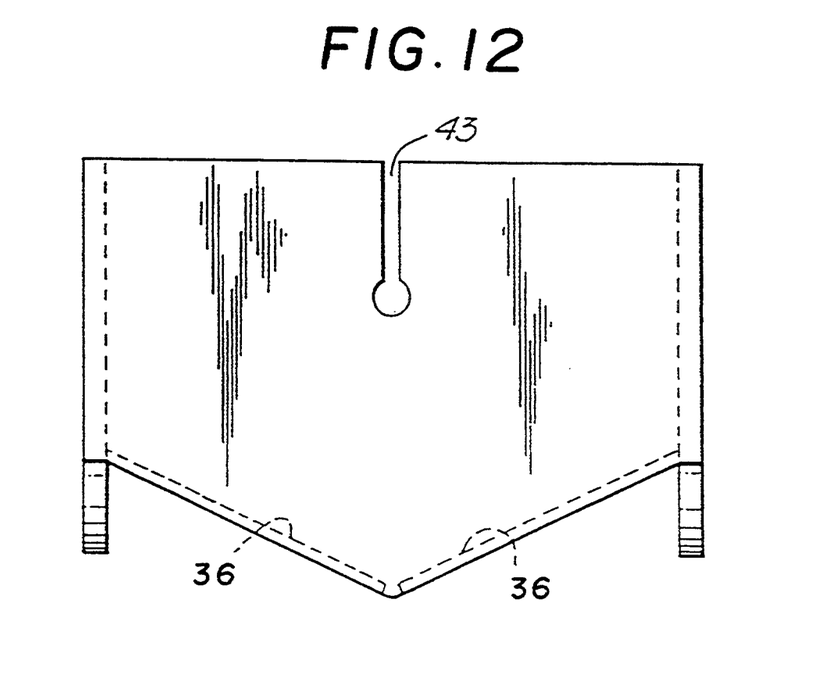
FIG. 12 shows the end view of the connector in FIG. 10.
Figure 15:
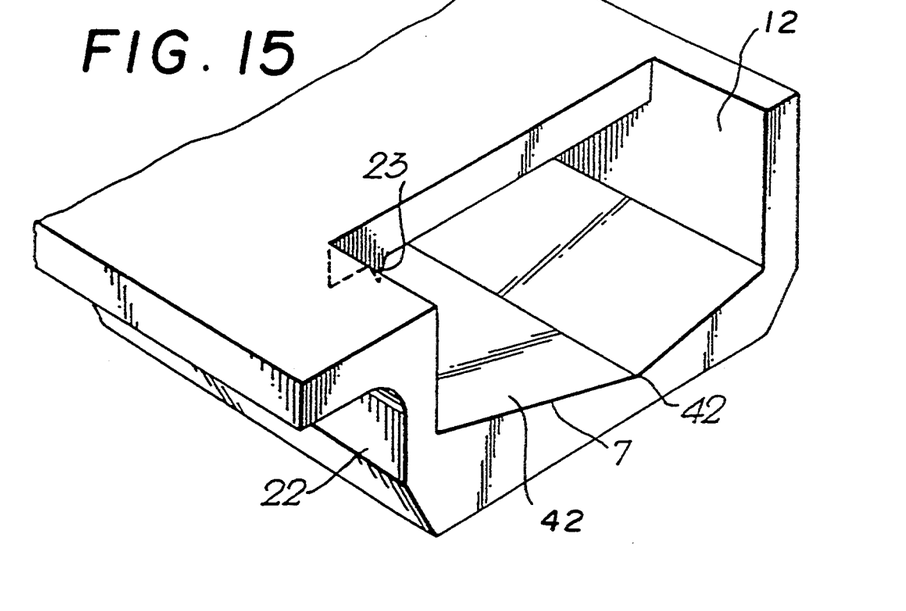
FIG. 15 shows a perspective view of the end portion of an obstructor segment of FIG. 14.

FIGS. 11 and 12 show respectively a perspective and an end view of the connector means 30,40. The V-shaped base 36 stabilizes the connector means 30,40 in the Base of the channel 12. FIG. 15 shows how a top portion of an obstructor segment 22 can be absent, exposing the channel 12 underneath. This permits the connector means 30,40 to be stabilized in the base 42 of the channel 12 and assists the correct alignment of the connector means 30,40 both during fitting and use.

The cable 31 is received in a slot 43 in the connector means 30,40 and retained there by an end stop 44. The roller 32 is rotatably received in the connecting means 30,40 at right angles to the direction of the well filler band 1'. The fixing bolt 35 is pivotally retained in the aperture 48 in the curved face of the roller 32, to allow the connector means 30,40 to articulate to fit the curvature of the well 11.

Figure 13:
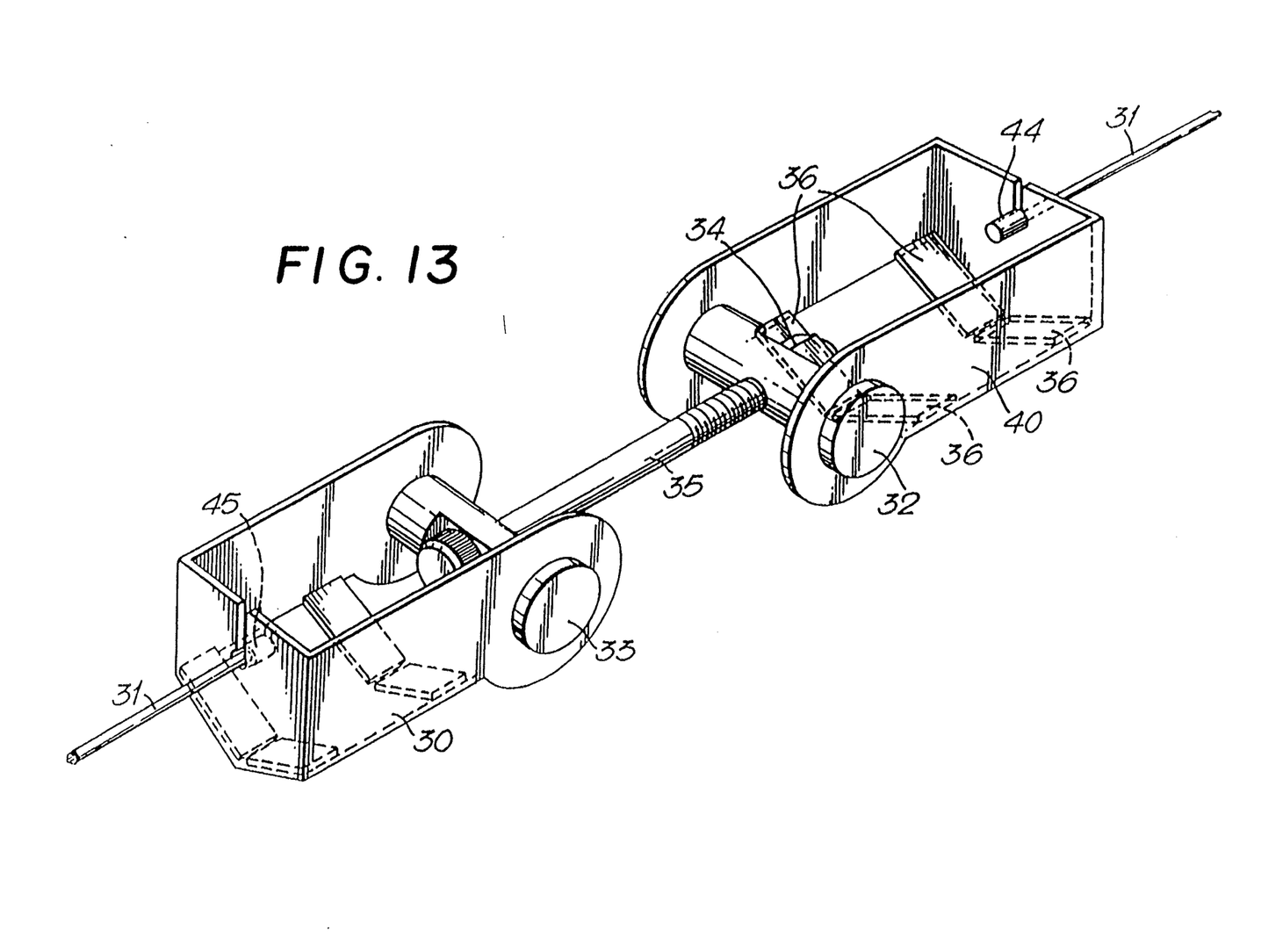
FIG. 13 shows a perspective view of the complete connector and cable.
Figure 14:
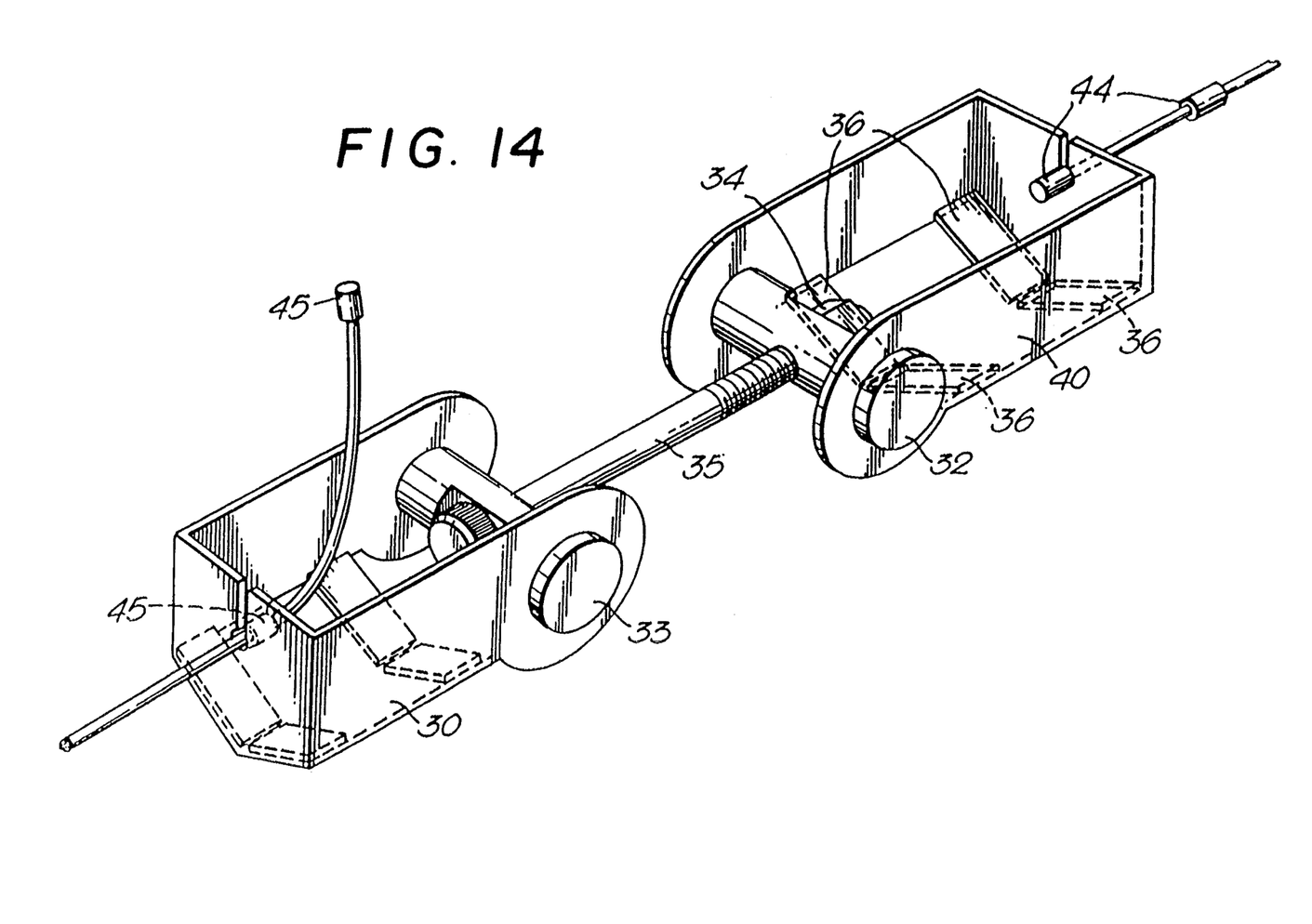
FIG. 14 shows the connector of FIG. 13 in an alternative condition.

FIGS. 13 and 14 show perspective views of the connector means 30,40 and cable 31. The cable 31 is provided with several stops 44,45 and so the length of the cable 31 can be varied by selecting the appropriate stop 44,45 for abutment against the connector end, to fit wheel rims of different circumference.

Figure 16:
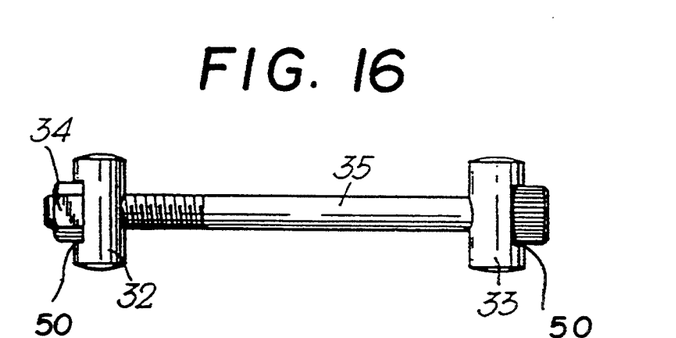
FIG. 16 shows a fixing bolt, locking nut and rollers.
Figure 17:
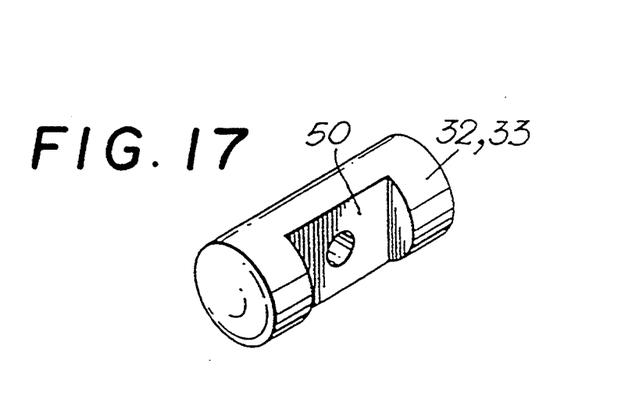
FIG. 17 shows a roller.

FIG. 16 shows the locking nut 34 and fixing bolt 35 used to secure the well filler band, together with rollers 32 to fit the connecting means 30,40. The locking nut 34 is fixed in position in a recess 50 in the roller 32,33 allowing the fixing bolt 35 to be adjusted with an allen key. FIG. 17 shows a perspective view of the roller 32,33 with an aperture and cutaway portion or recess 50 to receive a nut 34.

Well-fillers according to the present invention will retain a tire on a drop-center rim after loss of air pressure in the tire. They are suitable for use with tubed and tubeless tires, on steel and alloy wheels and are adjustable to fit a wide range of diameters of wheel and width of well. Unlike conventional well-fillers, they adjust to fit the rim to which they are applied.

Normal tire fitter's lubricant may be applied to the base of the wheel well prior to fitting of the well-filler to facilitate the motion of the obstructor segments as the band is tightened. Normal water and vegetable based tire fitter's lubricant evaporates quickly so this will not increase the likelihood of slippage of the well-filler in service.

I claim:

1. A well-filler of variable width for a well of a drop center wheel rim, comprising: a band having first and second ends, said band circumposing the rim in the well; a plurality of obstructor segments arranged side by side along the band and being in engagement with said band for sliding movement in a transverse direction relative thereto; and mutually engageable connector means attached at said first and second ends of said band, said connector means being adjustable for tightening of said band in the well around the rim, wherein engagement of said band with said segments is such that when said band is tightened in the well of a wheel rim some of said segments are moved in one transverse direction to said band and others of said segments are moved in an opposite transverse direction so that the width of the well-filler matches that of the well.

2. A well-filler according to claim 1, wherein each segment has a body portion with a channel said band extends through the channel in the body portion of each segment, the channel having an engagement surface to engage the corresponding surface of said band, said surfaces being angled such that the tightening of said band around the rim causes said segments to be urged in directions transverse to said band.

3. A well-filler according to claim 2, wherein the engagement surfaces of both said band and segments are a pair of equally inclined surfaces forming a V-shape in cross section.

4. A well-filler according to claim 1, wherein said segments are flexible to follow the arc of said band around the wheel rim.

5. A well-filler according to claim 1, wherein said connector means are pivotally attached to the ends of said band.

6. A well-filler according to claim 1, wherein the effective length of said band is variable by changing the position of the connector means on said band.

7. A well-filler according to claim 1, further comprising: a socket head screw and a locking nut wherein the connector means are mutually engaged by said socket head screw and locking nut the, said screw having a socket head so that it can be rotated by an angled driving member fitted in the socket, the nut being restrained from rotation by said connector means.

8. A well-filler according to claim 1, further comprising: a cable having a first and second end, wherein said band has a slot to receive said cable, the first and second ends of said cable being attached to respective ends of mutually engageable connector means such that said cable may be tightened by said connector means to tighten said band in the well.

9. A well-filler according to claim 8, wherein said connector means have a shaped base portion to align and stabilize said connector means in said segments.

10. A well-filler according to claim 1, further comprising: alignment means, and wherein said alignment means retain said segments against sliding movement in a transverse direction relative to said band prior to tightening said band.

11. A well-filler according to claim 10, wherein said alignment means include a groove on one of said segments or band and a protrusion on the other.

12. A well-filler according to claim 10, wherein said alignment means include a groove on said band and a protrusion on the other.

13. A well-filler according to claims 10, 11 or 12, wherein said segments have a hole on their outer peripheral surface to facilitate disengagement of said alignment means.

* * * * *